E. H. SMITH.
Adjustable Ratchet-Rods.
No. 143,538. Patented Oct. 7, 1873.
Fig. 1.    Fig. 2.       Fig. 3.
Fig. 4.
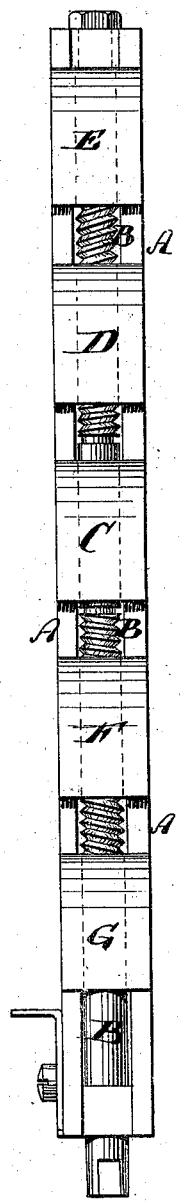
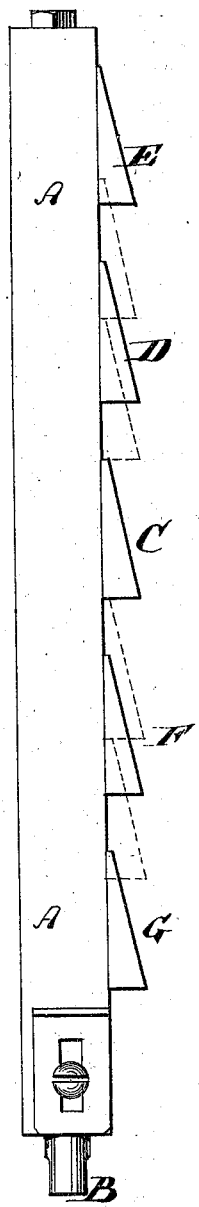
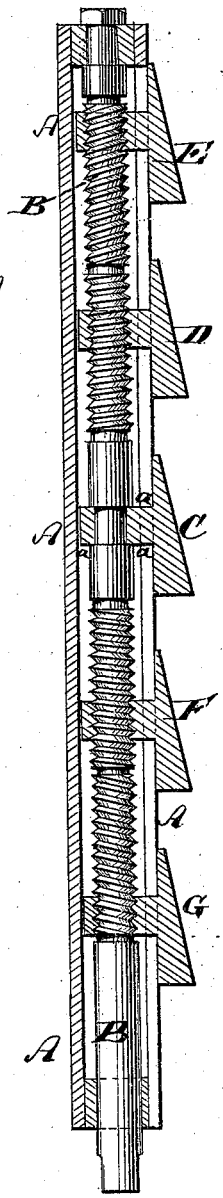
Witnesses:
Fred Haynes
Ford Busch
Edward H. Smith
by his Attorneys
Brown & Allen

UNITED STATES PATENT OFFICE.

EDWARD H. SMITH, OF WORCESTER, MASSACHUSETTS, ASSIGNOR TO
R. BALL & CO., OF SAME PLACE.

IMPROVEMENT IN ADJUSTABLE RATCHET-RODS.

Specification forming part of Letters Patent No. 143,538, dated October 7, 1873; application filed August 21, 1873.

*To all whom it may concern:*

Be it known that I, EDWARD H. SMITH, of Worcester, in the county of Worcester and State of Massachusetts, have invented an Improved Adjustable Ratchet-Rod, of which the following is a specification:

Figure 1 is a face view, Fig. 2 a side view, Fig. 3 a longitudinal section, and Fig. 4 a transverse section, of my improved ratchet-rod.

Similar letters of reference indicate corresponding parts in all the figures.

The object of this invention is to produce a ratchet-rod for use on all kinds of machinery, and on which the teeth can be adjusted at suitable distances away from or toward each other by a simple movement of a spindle connecting them; and the invention consists in connecting all the teeth of the rod with a screw-spindle in such manner that by turning said spindle all the teeth but one will be moved to change their distances in the desired manner. The screw-spindle is swiveled in the one tooth which is not movable, and has the direction of its thread reversed on the opposite sides of such immovable tooth, and the pitch of its threads increased for each tooth that is farther away from the immovable tooth. Thereby the movable teeth, when adjusted, will traverse a greater distance the farther away they are from the immovable tooth, causing the requisite equal adjustment of distance between all. The screw-spindle has bearings in a slotted grooved bar, which supports the teeth and gives rigidity to all parts.

In the accompanying drawing, the letter A represents the supporting-bar of my improved ratchet-rod. In the ends of the same are bearings for the longitudinal screw-spindle B. This spindle passes through the shank $a$ of the central one of the ratchet-teeth C, and has shoulders bearing against such shank $a$, so that, howsoever the screw-spindle be turned, the position of the tooth C will not be changed, the spindle turning loose in the shank of the same. At one side of the shank $a$ the screw-spindle is provided with a right-hand screw-thread, and at the other side with a left-hand screw-thread. On the side on which the right-hand screw-thread is formed on the spindle there are two (more or less) teeth, D E, &c., equal in size and shape to the tooth C. On that side of the tooth C on which the spindle has the left-hand screw there are two (more or less) ratchet-teeth, F G, &c., also equal in style and size to the tooth C. All of these teeth have shanks embracing the screw-spindle, and passing through the longitudinal slot of the bar A, as clearly indicated in Fig. 3. The right-hand screw-thread of the spindle, which is embraced by the shank of the tooth D that is nearest to C at one side thereof, has less pitch than that portion of the same screw which is embraced by the shank of the tooth E, which is farther away from C than D, and so forth, the pitch increasing with the distance of the teeth from the immovable tooth C. The same difference of pitch occurs at the other side, there being less pitch for the tooth F than for G, and so on. The difference in the pitch for the several teeth is so regulated that for every additional tooth an additional unit of motion will be obtained. Thus, if the spindle is turned to cause the teeth D to move one unit, which I will call $x$, away from C, the tooth E will, at the same time, be moved two units—*i. e.*, $2x$—away from the position it originally occupied. The next tooth, if there are any others, will have to move three units, $3x$, from the former position, and so on. This will cause the distance between the several teeth to be equally enlarged or reduced; for if the face of the tooth D is one inch from that of C, and that of E also one inch from that of D, there will be two inches between the faces of E and C; and, if the distance between the faces of D and C is to be increased to one and one-half inch, that between E and D will also have to be one and a half inch in order to make a uniform ratchet-bar, which will bring the distance between E and C to three inches. The tooth D will therefore have to be moved one-half inch, which is one unit, while the tooth E will have to be moved one inch, being two units in this case, the next tooth, if there are others, being moved one and a half inch, or three units, and so on. The same difference in thread and degree of adjustment occurs with the teeth on the other side of C, the reverse direction of the threads causing the simultaneous removal from or approach toward the tooth C of the several teeth on both sides of it. In this manner, therefore, by simply turning the screw-spindle B, all the several teeth of the ratchet-bar can be adjusted to an equal degree of greater or less distance from each other, which is the object to be attained by my invention.

What I claim as my invention, and desire to secure by Letters Patent, is—

1. The screw-spindle B, provided with left and right hand screw-threads, in varying degrees of pitch, and connected with the immovable ratchet-tooth C, and with the movable ratchet-teeth D E and F G, for the simultaneous adjustment of the movable teeth with reference to their distances from the immovable tooth C, and from each other, substantially as specified.

2. The grooved and slotted bar A, in combination with the right-and-left threaded screw-spindle B, immovable ratchet-teeth C, and movable ratchet-teeth D E and F G, all arranged to operate substantially as described.

EDWARD H. SMITH.

Witnesses:
I. T. MERIAM,
J. HENRY HILL.